(12) United States Patent
Holm et al.

(10) Patent No.: US 11,528,888 B2
(45) Date of Patent: Dec. 20, 2022

(54) SYSTEM FOR FEEDING FARM ANIMALS WITH A LIQUID CONTAINING FULL MILK

(71) Applicants: Hans Joachim Holm, Westerrönfeld (DE); Hans-Joachim Laue, Osterrönfeld (DE)

(72) Inventors: Hans Joachim Holm, Westerrönfeld (DE); Hans-Joachim Laue, Osterrönfeld (DE)

( * ) Notice: Subject to any disclaimer, the term of this patent is extended or adjusted under 35 U.S.C. 154(b) by 0 days.

(21) Appl. No.: 17/275,765

(22) PCT Filed: Sep. 13, 2019

(86) PCT No.: PCT/EP2019/074530
§ 371 (c)(1),
(2) Date: Mar. 12, 2021

(87) PCT Pub. No.: WO2020/053411
PCT Pub. Date: Mar. 19, 2020

(65) Prior Publication Data
US 2022/0030831 A1    Feb. 3, 2022

(30) Foreign Application Priority Data
Sep. 13, 2018   (EP) ...................................... 18194285

(51) Int. Cl.
*A01K 7/02* (2006.01)
*A01K 9/00* (2006.01)

(52) U.S. Cl.
CPC ................ *A01K 9/00* (2013.01); *A01K 7/022* (2013.01); *A01K 7/027* (2013.01)

(58) Field of Classification Search
CPC . A01K 7/00; A01K 7/02; A01K 7/022; A01K 7/025; A01K 7/027; A01K 9/00; A01K 9/005
(Continued)

(56) References Cited

U.S. PATENT DOCUMENTS 3,307,521 A * 3/1967 Tavera ...................... A01K 9/00
                                                                                    119/71
4,803,955 A   2/1989 Gonsalves
(Continued)

FOREIGN PATENT DOCUMENTS

CN        204616704 U        9/2015
CN        204707699 U       10/2015
(Continued)

OTHER PUBLICATIONS

PCT/EP2019/074530; international filing date Sep. 13, 2019; International Search Report and Written Opinion, dated Dec. 10, 2019 (12 pages).
(Continued)

*Primary Examiner* — David J Parsley
(74) *Attorney, Agent, or Firm* — Barclay Damon LLP

(57) ABSTRACT

A system for feeding farm animals comprises two milk tanks and a drawing line. The two milk tanks are configured to receive a stored full milk quantity and the drawing line comprises two drawing line portions each comprising a drain valve and each connected to one of the two milk tanks. A preparing unit is configured to prepare a liquid ration and a connecting line configured to connect the drawing line with the preparing unit. a cleaning unit comprises at least one cleaning agent container configured to receive a cleaning agent, and a cleaning agent supply apparatus configured to supply cleaning agent from the cleaning agent container to the two milk tanks. A control is configured to actuate the cleaning unit, the preparing unit, and each drain valve to guide the cleaning agent guided from one of the two milk tanks through the connecting line into the preparing unit.

15 Claims, 2 Drawing Sheets

(58) Field of Classification Search
USPC .................................................. 119/72–73
See application file for complete search history.

(56) References Cited

U.S. PATENT DOCUMENTS

| | | | |
|---|---|---|---|
| 5,551,374 A * | 9/1996 | Wells | A01K 9/00 |
| | | | 119/57.92 |
| 6,016,769 A * | 1/2000 | Forster | A01K 5/0216 |
| | | | 119/71 |
| 6,360,691 B1 | 3/2002 | Laue et al. | |
| 9,955,670 B2 * | 5/2018 | Holm | A01K 9/005 |
| 2016/0135425 A1 | 5/2016 | Holm | |
| 2017/0223925 A1 | 8/2017 | Neal | |

FOREIGN PATENT DOCUMENTS

| | | |
|---|---|---|
| CN | 105660439 A | 6/2016 |
| CN | 106069858 A | 11/2016 |
| CN | 207411183 U | 5/2018 |
| CN | 207626348 U | 7/2018 |
| DE | 19910452 A1 | 1/2001 |
| DE | 20305754 U1 | 8/2004 |
| DE | 102011009076 B3 | 5/2012 |

OTHER PUBLICATIONS

PCT/EP2019/074530; international filing date Sep. 13, 2019; English translation of International Search Report, dated Dec. 10, 2019 (2 pages).
CN 201980068778.7; First Office Action; dated Jan. 26, 2022 (10 pages).
CN 201980068778.7; English Translation of First Office Action; dated Jan. 26, 2022 (10 pages).

* cited by examiner

SYSTEM FOR FEEDING FARM ANIMALS WITH A LIQUID CONTAINING FULL MILK

CROSS REFERENCE TO RELATED INVENTION

This application is a national stage application pursuant to 35 U.S.C. § 371 of International Application No. PCT/EP2019/074530, filed on Sep. 13, 2019, which claims priority to, and benefit of, European Patent Application No. 18194285.5, filed Sep. 13, 2018, the entire contents of which are hereby incorporated by reference.

FIELD OF TECHNOLOGY

The invention relates to a system for feeding farm animals with a liquid containing full milk. For feeding farm animals, for example calves, lambs, or piglets, automated drinking machines are used, which prepare liquid rations of a temperature-regulated liquid. The liquid can be mixed from milk replacement powder (MRP) and water. Also possible is a feeding with full milk or a mixture of full milk, milk replacement powder, and water. When the liquid containing full milk is used, hygiene plays a particularly big role. If a storage tank is used for providing the full milk, such storage tank must be cleaned regularly. This also applies to all other elements that come into contact with the full milk, for example lines and valves of the automated drinking machine and lines that lead from the automated drinking machine to a tap station and/or a sucking dummy.

BACKGROUND

In order to simplify the required cleaning measures, automated drinking machines have become known that can execute an automated cleaning. For this purpose, the elements of the automated drinking machine are flushed with a cleaning agent being added if necessary. During such a cleaning phase, the automated drinking machine cannot provide any liquid, and the sucking dummy must be separated from the automated drinking machine, for example by closing a valve. Such an automated drinking machine has become known from the document DE 10 2011 009 076 B3.

From U.S. Pat. No. 4,803,955, a feeding system has become known, which has a single full milk tank that is arranged in an elevated position. From the full milk tank, the milk runs through a heat exchanger into a liquid ration container arranged underneath it. For cleaning, a cleaning agent be injected into a water line, which leads to a spraying nozzle arranged in the full milk tank.

Based on this, the object of the invention is to provide a system for feeding farm animals with a liquid containing full milk, which can be easily cleaned and has a high availability.

BRIEF SUMMARY OF THE INVENTION

An embodiment of a system configured to feed farm animals with a liquid containing full milk comprises a full milk depot, which has a full milk tank or milk tank for receiving a full milk quantity and a drawing line. The system further comprises a preparing unit for preparing a liquid ration, which has a full milk supply line or milk supply line, a liquid ration container, and a tap line. A connecting line connects the drawing line with the full milk supply line. A sucking dummy is connected to the tap line. The system further comprises a cleaning unit having a cleaning agent container configured to receive a cleaning agent and a cleaning agent supply device, with which cleaning agent can be supplied to the full milk tank from the cleaning agent container. A control, which is configured to actuate the cleaning unit and the preparing unit for executing a cleaning operation such that a cleaning fluid is guided from the full milk tank through the connecting line into the preparing unit.

The full milk depot serves to store and provide a stored full milk quantity. For this purpose, it has a full milk tank with a fill capacity of, for example, at least 50 L, at least 100 L, or 150 L or more. Via the drawing line, the full milk can be drawn from the full milk tank. The full milk tank can have a closable lid, such that it can be easily filled after removing the lid.

In an embodiment, the function of the preparing unit can correspond substantially to that of an automated drinking machine. It prepares one liquid ration at a time, which is provided to a farm animal via the sucking dummy. As is known from the context of automated drinking machines, the liquid ration can be prepared individually for a specific farm animal, for example after identifying the animal by means of an identifying apparatus. Another possibility is a preparation of liquid rations that are intended for several farm animals at a time. In an embodiment, the preparing unit can have a storage container for milk replacement powder and a water connection, such that liquids containing full milk can be mixed in the liquid ration container, which additionally contain milk replacement powder and water, or such that a feeding free from full milk is possible with milk replacement powder and water. The preparing unit can have a water line that is connected to the water connection with a shut-off valve and that discharges into the full milk supply line. Then, water and full milk can potentially be filled into the liquid ration container via the same line.

In an embodiment, the providing of the liquid ration takes place via the feed line. The milk component processed in the liquid ration is supplied to the preparing unit via the full milk supply line. The full milk supply fine is connected to the drawing fine of the full depot via a connecting line. This connection can be configured differently, depending on the configuration of the system. For example, the full milk depot and the preparing unit can each be arranged in a separate housing. In this case, free ends of the drawing line and the full milk supply line can have couplings or other connecting apparatuses, for example arranged on and/or attached to the corresponding housing. The connecting line is then a separate line, the ends of which are connected to the respective connecting apparatuses. However, it is also possible that the connecting line transitions seamlessly into the drawing line or the full milk supply line, respectively, at one of its ends or at both of its ends. This solution offers itself in particular when full milk depot and preparing unit are accommodated inside a common housing. In an embodiment, the sucking dummy can in particular be arranged in a tap station or in a tap stall. Also possible is a connection of the tap line with several sucking dummies and/or tap stations.

In an embodiment, the system according to the invention comprises a cleaning unit, which can be assigned in particular to the full milk depot and/or be arranged in a housing of the full milk depot. Such unit has at least one cleaning agent container and a cleaning agent supply apparatus, with which cleaning agent can be supplied to the full milk tank. With the aid of the cleaning agent, the full milk tank can thereby be cleaned.

In embodiments of the system, there is also a control with which the cleaning unit and the preparing unit are actuated for executing a cleaning operation, such that a cleaning fluid is guided from the full milk tank through the connecting line into the preparing unit. Which elements of cleaning unit and preparing unit are actuated in detail by the control depends on the configuration of the stated units. In particular, it is provided that the control actuates the cleaning agent supply apparatus of the cleaning unit, in particular in such a way that a defined quantity of cleaning agent is input into the full milk tank. Inside the preparing unit, in particular a valve and/or a conveying apparatus an be actuated, which enable a full milk supply from the full milk supply line into the liquid ration container outside of the cleaning operation, i.e., when a liquid ration is to be prepared. The liquid ration container can also be called a mixing container.

In an embodiment, a drain valve can be arranged in the drawing line. Such valve can also be actuated by the control in order to execute the cleaning operation described. In this case, the control also actuates the elements of the full milk depot.

By comparison with the automated cleaning limited to an automated drinking machine as known from the prior art, the invention has several important advantages. Firstly, all elements coming into contact with the full milk "upstream" of the tap line can be cleaned automatically, including the full milk tank, the drawing line, the connecting line, and the full milk supply line. An additional manual cleaning of these elements is therefore not required, which represents a significant simplification of the cleaning operation.

Secondly, inevitable down times caused by the cleaning are reduced to a minimum by the uniform cleaning operation. In particular, there are no additional down times during a separate cleaning of the full milk depot and/or the connecting line. Also, it is not required to disconnect these elements from one another for a manual cleaning and subsequently reconnect them. Thereby, a higher availability of the system is achieved.

Thirdly, a particularly efficient and environmentally friendly cleaning agent utilization is achieved, since the cleaning fluid already produced in the full milk tank with the cleaning agent is not discarded after the cleaning of the full milk tank but is instead reused for the cleaning of the connecting line and the preparing unit.

In one embodiment, the sucking dummy is connected to the tap line via a sucking line, wherein a branching line branches of from the sucking line in a branching point, in which a pump is arranged, wherein the control is designed to actuate the preparing unit and the pump in such a way that the cleaning fluid is guided from the grill milk supply line through the liquid ration container, through the tap line, through the sucking line up to the branching point, and then through the branching line during the cleaning operation. The branching line can have an open end, which can for example be arranged above a drain outlet. The branching point can be arranged near to the sucking dummy, such that the sucking line is covered completely or almost completely by the automated cleaning.

In an embodiment, a fill level sensor and/or an empty level indicator is arranged in the drawing line. The fill level sensor or empty level indicator, respectively, is connected to the control, such that the control can ensure that the cleaning operation is only executed when the full milk tank is empty. Further, with the aid of the fill level monitoring, the quantity of cleaning agent in the full milk tank can be monitored and/or controlled during a cleaning operation.

In an embodiment, the cleaning unit has a water connection and a cleaning line, which leads from the water connection up to the full milk tank, wherein the cleaning agent supply apparatus has a pump with which cleaning agent can be pumped from the cleaning agent container into the full milk tank and/or into the cleaning line. The pump is connected to the control and is actuated by the control in order to input a desired cleaning agent quantity into the milk tank. Furthermore, the water connection can be assigned a valve that is also connected to the control, such that the control can also control the water supply into the full milk tank.

In one embodiment, the cleaning line is connected to a spraying nozzle, which is arranged in the full milk tank. Thereby, floor, walls, and/or lid of the full milk tank can be sprayed with the cleaning age in order to enable a cleaning that is thorough and at the same time goes along with low water and cleaning agent consumption. It is to be understood that potentially several such spraying nozzles can be connected to the cleaning line.

In one embodiment, a first circulation line exists, which leads from the drawing line to the full milk tank and in which a circulation pump is arranged, such that cleaning fluid can be guided back into the full milk tank. The circulation pump can also be connected to the control and be controlled by such control. Then, a repeated flushing of the full milk tank and the drawing line can be performed during the described cleaning operation. It is also possible that a second circulation line exists via which the cleaning fluid can be guided back from the liquid ration container into the full milk supply line. In the second circulation line, a valve and/or a second circulation pump can be arranged, wherein valve and/or second circulation pump can also be connected to the control and be controlled by such control. The cleaning operation can then be executed automatically such that the preparing unit is also optionally flushed several times.

In one embodiment, the full milk depot has a heating and/or cooling apparatus, a thermal insulation, and/or a stirrer. For example, the full milk tank can have a wall with a thermal insulation layer. The heating and/or cooling apparatus can have an electric heating in a wall of the full milk tank or in a receiving space of the full milk tank and/or a heating and/or cooling coil through which a hot or cold fluid can be guided. Such a heating and/or cooling coil can also be arranged in a wall of the full milk tank or in a receiving space thereof. By means of the measures stated, storage of the full milk in the full milk depot is possible under optimum conditions. In particular, it is possible to keep the microbial count of the full milk low by means of adequate cooling. A temperature sensor can be assigned to the full milk tank, which measures a temperature of the full milk located in the full milk tank and which is connected to the control. The heating and/cooling apparatus and/or the stirrer can be connected to the control and be controlled by such control. Thereby, the control can, for one, establish the desired storage conditions for the full milk by mixing the full milk and/or cooling it and, for two, support a cleaning operation by activating the stirrer during a flushing of the full milk tank.

In one embodiment, the heating apparatus of the full milk depot is configured to heat the full milk located in the full milk tank to a pasteurization temperature and to hold it at the pasteurization temperature for a specified period of time. Further, the cooling apparatus of the full milk depot can be designed to cool the full milk to the temperature required for storage after the specified period of time. Also for the pasteurization, the control can be connected to the heating apparatus and/or the cooling apparatus and actuate them in a suitable manner. In combination with a temperature sensor, the control can control the desired temperature curve on the basis of the measured temperature by actuating the heating apparatus or the cooling apparatus, respectively. It is then possible to do without a separate pasteurization of the full milk before filling it into the full milk tank, whereby the full milk feeding is further simplified.

In one embodiment, the full milk depot has two full milk tanks, wherein the drawing line has two drawing line portions, which each have a drain valve and are connected to one of the two full milk tanks. Included are three-way valves, which connect optionally one or the other of the two drawing line portions with a continuing portion of the drawing line. All features described above for the full milk tank can be realized for any of the two full milk tanks; for example, each of the two full milk tanks can have a stirrer, a heating and/or cooling apparatus, a thermal insulation, and/or a closable lid, etc. Through the use of two full milk tanks, the full milk depot can provide full milk continuously. In particular, full milk can, after a cleaning operation that involves one of the two full milk tanks, be immediately provided from the other full milk tank, even before the full milk tank that had just been cleaned has been refilled. Thereby, the availability of the system is further increased, and a user gains significant flexibility with regard to the filling time. Furthermore, at least one of the two full milk tanks and the drawing line portion assigned to such full milk tank as well as the connecting line are cleaned during an automated cleaning. An additional manual cleaning is therefore not required, even if two full milk tanks are used. The two drawing line portions each have a drain valve via which the supply of full milk from the respective full milk tank or of cleaning fluid located therein can be controlled to flow via the connecting line to the preparing unit. The two drain valves can also be connected to the control and be controlled by such control. The two drawing line portions can be combined in a branching point and discharge directly into the connecting line or into a common (third) drawing line portion there. Optionally, each of the two drawing line portions can be assigned a fill level sensor and/or an empty level indicator as described above with regard to the drawing line. The above statements regarding the cleaning agent and water supply into the full milk tank apply accordingly for each of the two full milk tanks.

In one embodiment, the control is configured to automatically perform a cleaning operation based on a schedule and to specify, taking into account a forecast need, a filling quantity for a full tank that is empty at a first cleaning time, such that it will be sufficient until a second cleaning time which follows after the first cleaning time. Based on a schedule is to mean in particular at specified times, for example at 6.00 a.m. and at 6.00 p.m., or at specified time intervals, for example every 12 hours. The forecast need can, for example, be input manually or be specified for the control in another manner. In particular, the forecast need can be determined by the control for example on the basis of the liquid quantity prepared by the preparing unit in a preceding period of time. For this purpose, in particular the liquid quantity in a period of time of the previous day/days corresponding to the forecast period of time can be used. By specifying a filling quantity for a future period of time, taking into account such a need forecast, it can be ensured that the stored full milk quantity, which is subsequently filled in by an operator person in accordance with the filling quantity in a previously empty full milk tank, will cover the need in the future period of time. Additionally to the forecast need, a fill level in the respective other full milk tank can be taken into account for the specification of the filling quantity. In total, it is achieved that, after filling in a specified filling quantity, an uninterrupted supply is possible for the farm animals until the next cleaning operation.

In another embodiment, which is possible alternatively or additionally to the specification of a filling quantity described above, the control is configured to automatically execute a cleaning operation based on a schedule and, taking into account a forecast need for one of the two full milk tanks that is empty at a first cleaning time, to specify a time such that, when one of the two full milk tanks is being filled, a stored full milk quantity is available in the one of the two full milk tanks at the latest at the time of filling before the other one of the two full milk tanks is empty. The specified filling time can, for example, be indicated to a user in a display. By specifying a later filling time, it is made easier in practice to achieve a continuous availability of full milk. At the same time, unnecessarily early filling is avoided, whereby a microbial contamination is counteracted.

In one embodiment, the control is configured to take into account the time required for a pasteurization of the full milk when specifying the filling time, wherein the pasteurization can take place either in the one or both of the full milk tanks or in an external pasteurization apparatus. The required time can be determined on the basis of data on earlier pasteurization operations, or it can be determined by computation, in particular by taking into account the specified filling quantity. If a pasteurization in the full milk tank is provided, such pasteurization can be started by the control at the computed filling time. If an external pasteurization apparatus is provided for the pasteurization, for example a continuous-flow pasteurizer, such pasteurizer can be connected to the control via a communication interface, and the control can start the continuous-flow pasteurization at the computed filling time. In any case, it is made significantly easier to provide the pasteurized stored full milk quantity in a timely manner, and an unnecessarily early pasteurization, which can result in a higher microbial contamination level, is avoided.

In one embodiment, the cleaning line transitions at a branching point into two cleaning line portions, which each have a shut-off valve and lead to one of the full milk tanks. The two shut-off valves are each connected to the control and are actuated by such control, so that, during a cleaning operation, the control can control into which of the two full milk tanks the cleaning agent is input. Here, too, a three-way valve is included.

In one embodiment, a full milk pump and/or a heating apparatus are arranged in the full milk supply line, with which a liquid supplied through the full milk supply line can be brought to the correct temperature before filling the liquid ration container. The heating apparatus can in particular be a boiler. Through this solution, the full milk is not brought to the desired drinking temperature until immediately before being provided in the liquid ration container. Another advantage is that full milk pump and heating apparatus are covered by the automated cleaning operation.

In one embodiment, the control has a notification unit, which is designed to inform a user of a status of the system by means of a display and/or by transmitting an electronic message. The status can, for example, comprise one or several of the following pieces of information: a fill level in a full milk tank, a fill level in a cleaning agent container, a temperature or a temperature curve in a full milk tank, a deviation of a measured value from a nominal value, that and/or when a cleaning operation is being executed, that and/or when a pasteurization is being performed, or a filling quantity determined by the control. Such information can either be represented with a display on the system, or it can be transmitted to the user as an electronic message, in particular by e-mail, SMS text message, or via a social network. By means of this information, the feeding is further simplified for the user.

In one embodiment, the control has a documentation unit, which is configured to document a cleaning operation. Alternatively or additionally, the documentation unit can be configured to document a pasteurization operation. By means of the documentation unit, it is possible to verify at any time that the system was properly cleaned or that the fed full milk was properly pasteurized. For this purpose, the respective relevant information can be stored by the control and/or made available for a subsequent analysis.

In one embodiment, the cleaning agent supply apparatus has a separate cleaning agent line via which cleaning agent can be supplied to the preparing unit, while circumnavigating the full milk depot, from the at least one cleaning agent container, and the control is designed to perform a cleaning of the preparing unit automatically based on a specified schedule, such cleaning not including the full milk depot. The cleaning of the preparing unit can optionally include all line portions of the preparing unit up to the sucking dummy. The separate cleaning agent line can, for example, discharge into the liquid ration container or into a water line leading to the liquid ration container. The schedule can specify a cleaning of the preparing unit for example in fixed time intervals, e.g. every 12 hours after a previous cleaning. This embodiment takes into account that the preparing unit should be cleaned more frequently in certain application cases than the full milk tanks, in particular if the full milk is stored and cooled inside the full milk tanks, which is typically possible without problems for 24 for 48 hours. In particular, the full milk tanks can be cleaned based on a schedule and/or every time they are empty, wherein such cleaning, as explained above, will include the preparing unit and potentially further components of the system. Additional cleanings of the preparing unit can take place as needed without having to empty out the corresponding full milk tank for this purpose.

BRIEF DESCRIPTION OF THE DRAWINGS

The invention is explained in greater detail below with reference to an exemplary embodiment. In the drawings.

DETAILED DESCRIPTION OF THE INVENTION

Figure 1:
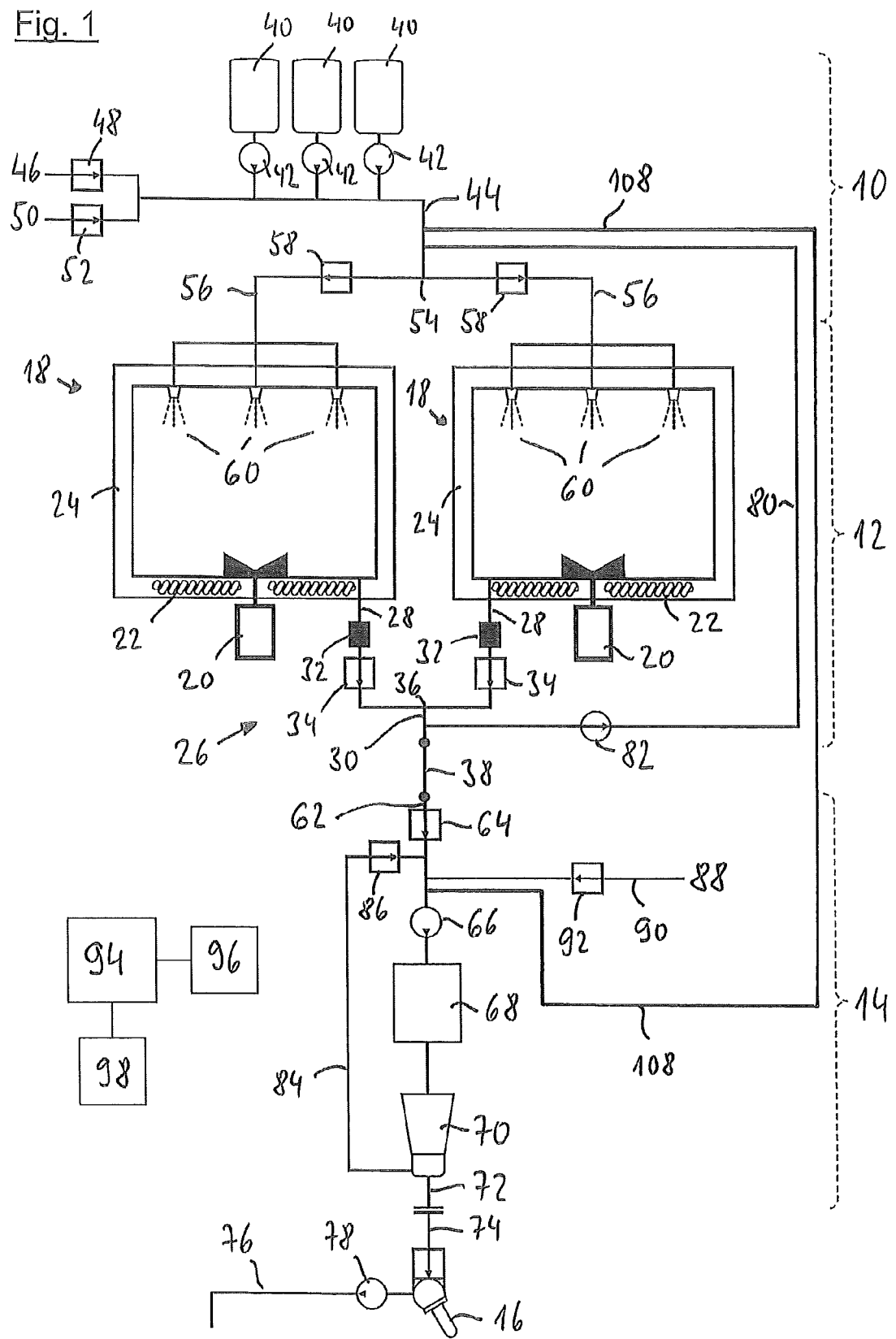
FIG. 1 illustrates a schematic depiction of an embodiment of a system for feeding farm animals with a liquid containing full milk.

The system for feeding farm animals with a liquid containing full milk from FIG. 1 has a cleaning unit 10, a full milk depot 12, a preparing unit 14, and a sucking dummy 16. The full milk depot 12 comprises two full milk tanks 18, which each have a fill capacity of at least 150 L. Each of the two full milk tanks 18 has a stirrer 20, a heating/cooling coil 22, and a heat insulation 24.

A drawing line 26 of the full milk depot 12 comprises two drawing line portions 28, which are each connected to one of the two full milk tanks 18 and in each of which a fill level sensor 32 and a drain valve 34 are arranged. The ends of the drawing line portions 28 that are distant from the respective full milk tank 18 discharge into a common drawing line portion 30 at a branching point 36. At the end of the common drawing line portion 30 that is distant from the branching point 36, the drawing line 26 is connected to a connecting line 38 or transitions into such line.

In FIG. 1, a cleaning unit 10 is located above the full milk depot 12, which can be integrated in a housing (not shown) of the full milk depot 12. The cleaning unit 10 has three cleaning agent containers 40, each of which contains a cleaning agent. Each cleaning agent container 40 is assigned a pump 42, with which cleaning agent can be metered from the corresponding cleaning agent container 40 into a cleaning line 44.

The end of the cleaning line 44 shown in FIG. 1 on the left is connected to a cold water connection 46 via a shut-off valve 48 and is connected to a hot water line 50 via a shut-off valve 52. The other end of the cleaning line 44 leads to a branching point 54 at which the cleaning line 44 branches into two cleaning line portions 56. In each of these cleaning line portions 56, a shut-off valve 58 is arranged. The free ends of the cleaning portions 56 are each connected to several spray nozzles 60, which are arranged in one of the full milk tanks 18. In this manner, for example by opening the shut-off valve 52 and the shut-off valve 58 while the shut-off valves 48, 56 are closed, hot water can be sprayed into the full milk tank 18 shown in FIG. 1 on the left potentially with cleaning agent being added from one of the cleaning agent containers 40 by actuating the assigned pump 42 accordingly. Subsequently, the cleaning fluid is first located in the respective full milk tank 18.

A full milk supply line 62, in which an inlet valve 64 is arranged, is connected to the end of the connecting line 38 which is distant from the drawing line 26. Furthermore, the preparing unit 14 comprises a full milk pump 66, which is connected to the full milk supply line 62, and which can convey the liquid located in the full milk supply line 62 through a heating apparatus 68 into a liquid ration container 70.

At the liquid ration container 70, a tap line 72 of the preparing unit 14 begins, which discharges into a sucking line 74, which is connected to a sucking dummy 16. At a branching point that is not shown in the sucking line 74 just upstream of the sucking dummy 16, a branching line 76 branches off, in which a pump 78 is arranged.

Furthermore, FIG. 1 shows a first circulation line 80 in which a first circulation pump 82 is arranged. The first circulation line 80 starts at the common drawing line portion 30 and leads into the cleaning line 44, just upstream of the branching point 54. Also shown is a second circulation line 84, in which a shut-off valve 86 is arranged and which leads back from the liquid ration container 70 to the full milk supply line 62. A cold water connection 88 is connected to the full milk supply line 62 via a line 90, in which a shut-off valve 92 is arranged. Via this line 90, cold water can be supplied for mixing a liquid ration. A separate cleaning agent line 108 connects the cleaning line 44 with the full milk supply line 62 at a point downstream of a discharge of the line 90 with which cold water can be input in the milk supply line 62.

Finally, the system from FIG. 1 includes a control 94, which is connected to each of the valves mentioned and each of the pumps mentioned via connections that are not shown. Furthermore, the control 94 is connected to the two stirrers 20, to the heating apparatus 68, and to the fill level sensors 32. The control 94 is configured to execute an automated cleaning operation. For this purpose, the full milk tank 18 to be included in the respective cleaning is filled with cleaning fluid in a first step as described above. For this purpose, the control 94 actuates one or both shut-off valves 48, 52 at the water connections 46, 50 and at least one of the pumps 42. Subsequently, the shut-off valve 34 assigned to this full milk tank 18 and the inlet valve 64 of the control 94 are opened, and the full milk pump 66 is actuated by the control 94 such that the cleaning fluid is guided from the respective full milk tank 18 through the drawing line 26, the connecting line 38, and the full milk supply line 62 into the liquid ration container 70. By actuating the pump 78 by means of the control 94, the cleaning fluid is then guided from the liquid ration container 70 through the tap line 72, through the sucking line 74 up to the branching point upstream of the sucking dummy 16, and from there onwards through the branching line 76 in order to include these elements in the cleaning, as well. A notification unit 96 and a documentation unit 98, which fulfill the functions described above, are represented only schematically. They can be integrated in the control 94 or, as indicated in FIG. 1, connected to such control.

Figure 2:
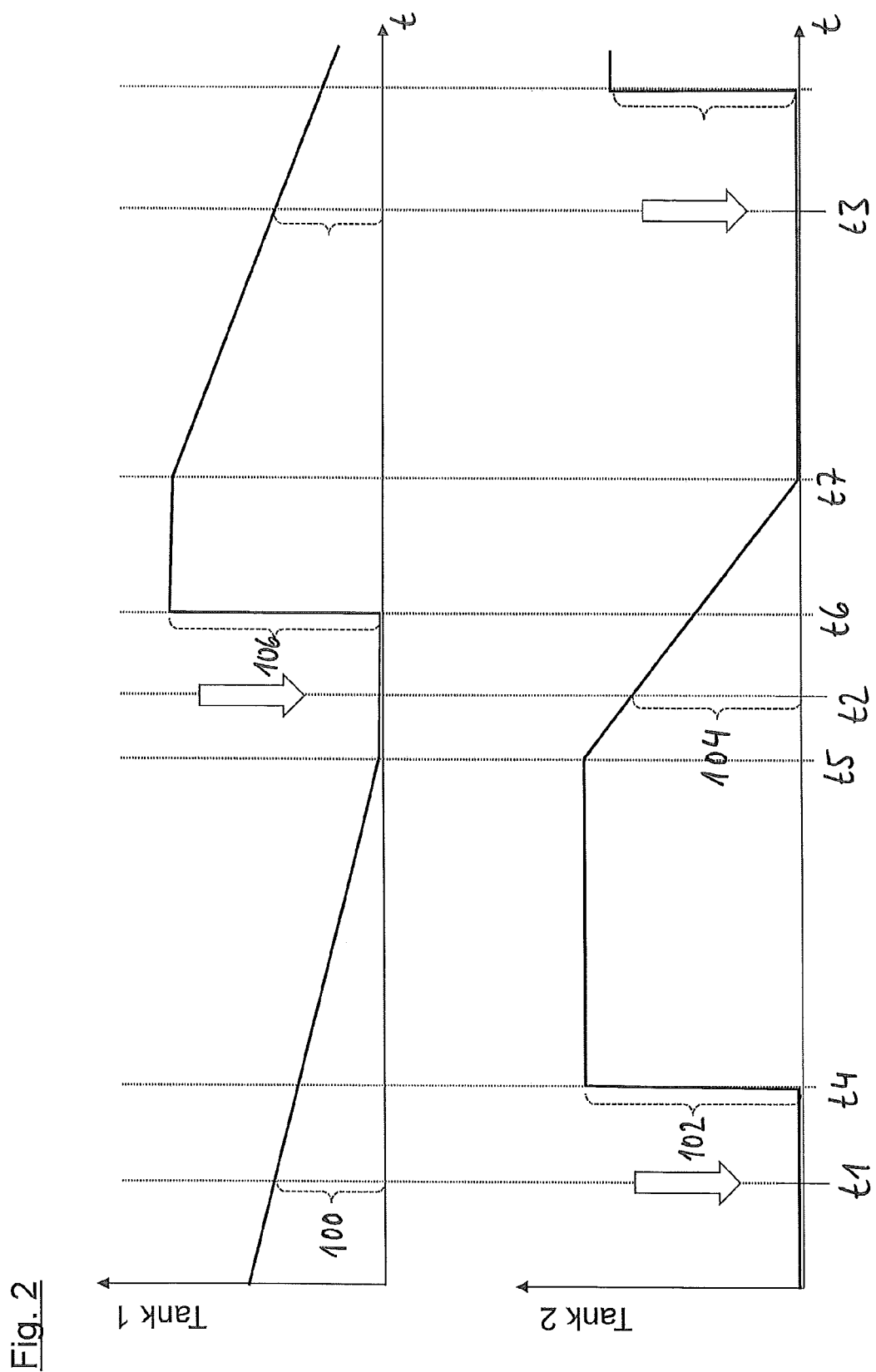
FIG. 2 illustrates a diagram with the curve over time of the fill levels in the two full milk tanks of the system from FIG. 1.

In the following, the process of using the system from FIG. 1 over time is described an example based on FIG. 2. These explanations apply not only to the system from FIG. 1, but are independent from the details of its configuration. They apply equally to other systems according to the invention having two full milk tanks 18. The top diagram of FIG. 2 shows the fill level of the left full milk tank 18 from FIG. 1, also called tank 1 in the following, the bottom diagram of FIG. 2 shows the curve over time of the fill level of the full milk tank 18 shown in FIG. 1 on the right, also called tank 2 in the following.

The time coordinate runs horizontally and comprises three times t1, t2, and t3, at each of which an automated cleaning operation which includes one of the two full milk tanks 18 is executed. These cleaning operations are illustrated by the three arrows. As the diagrams show, tank 2 is empty at the time t1, and there is a residual quantity 100 in tank 1, which is assumed to be 100 L in the example.

The control 94 has determined based on the consumption of the corresponding period of time of the previous day that there will probably be a need for 250 L at the cleaning time t2. Taking into account this forecast demand as well as the residual quantity 100 and a safety margin of 50 L, the control 94 specifies a filling quantity 102 for tank 2 of 250 L−100 L+50 L=200 L for the time t1. At time t4, several hours after the time t1, this filling quantity 102 is filled into the tank 2 by an operator. Meanwhile, the full milk continues to be provided for the preparing unit 14 from tank 1, as is illustrated by the slowly decreasing fill level therein that is shown. At the time t5, tank 1 is empty and by closing one of the drain valves 34 and opening the other drain valve 34, the supply of the preparing unit 14 is switched to tank 2 with practically no interruption.

At the time t2, the automated cleaning, which includes tank 1 this time, then takes place according to the specified schedule. At the same time, it is determined that a residual quantity 104 of 150 L is present in tank 2. Based on a forecast need for 280 L up to the time t3 of the next scheduled cleaning and a safety margin of 50 L, the control 94 determines a filling quantity 106 for tank 1 of 280 L−150 L+50 L=180 L. A user tills this tilling quantity into tank 1 at the time t6. A little later, at time t7, tank 2 is empty, and the supply of the preparing unit 14 is switched to tank 1. The operations described repeat at the time t3 of the next cleaning. It is to be understood that the computation of the filling quantities need not necessarily be executed at the time of a cleaning.

LIST OF REFERENCE NUMERALS

10 Cleaning unit
12 Full milk depot
14 Preparing unit
16 Sucking dummy
18 Full milk tank
20 Stirrer
22 Heating/cooling coil
24 Thermal insulation
26 Drawing line
28 Drawing line portion
30 Common drawing line portion
32 Fill level sensor
34 Drain valve
36 Branching point
38 Connecting line
40 Cleaning agent container
42 Pump
44 Cleaning line
46 Cold water connection
48 Shut-off valve
50 Hot water connection
52 Shut-off valve
54 Branching point
56 Cleaning line portion
58 Shut-off valve
60 Spraying nozzle
62 Full milk supply line
64 Inlet valve
66 Full milk pump
68 Heating apparatus
70 Liquid ration container
72 Tap line
74 Sucking line
76 Branching line
78 Pump
80 First circulation line
82 Pump
84 Second circulation line
86 Shut-off valve
88 Cold water connection
90 Line
92 Shut-off valve
94 Control
96 Notification unit
98 Documentation unit
100 Residual quantity
102 Filling quantity
104 Residual quantity
106 Filling quantity
108 Separate cleaning agent line

The invention claimed is:
1. A system for feeding farm animals with a liquid containing full milk, the system comprising:
a full milk depot comprising two milk tanks and a drawing line, wherein the two milk tanks are configured to receive a stored full milk quantity, and wherein the drawing line comprises two drawing line portions each comprising a drain valve and each connected to one of the two milk tanks;
a preparing unit configured to prepare a liquid ration, wherein the preparing unit comprises,
a milk supply line,
a liquid ration container, and
a tap line;
a connecting line configured to connect the drawing line with the milk supply line;
a sucking dummy connected to the tap line;
a cleaning unit comprising, at least one cleaning agent container configured to receive a cleaning agent, and a cleaning agent supply apparatus configured to supply cleaning agent from the cleaning agent container to the two milk tanks; and a control configured to actuate the cleaning unit, the preparing unit, and each drain valve to guide the cleaning agent guided from one of the two milk tanks through the connecting line into the preparing unit, wherein the control is configured to automatically perform a cleaning operation based on a programmed schedule, and wherein the control is configured to:

forecast demand for one of the two milk tanks which is empty at a first cleaning time;

specify a filling quantity that will satisfy the forecasted demand until a second cleaning time which follows the first cleaning time; and specify a filling time such that, when the one of the two milk tanks is filled, a stored full milk quantity is available in the one of the two milk tanks before a second of the two milk tanks is empty.

2. The system according to claim 1, wherein:

the sucking dummy is connected to the tap line via a sucking line;

a branching line branches off from the sucking line at a branching point; and a pump is located in the branching line.

3. The system according to claim 2, wherein during a cleaning operation, the control is configured to actuate the preparing unit and the pump to guide the cleaning agent from the milk supply line through the liquid ration container, through the tap line, through the sucking line to the branching point and then through the branching line.

4. The system according to claim 1, further comprising at least one of a fill level sensor and an empty level indicator positioned in the drawing line.

5. The system according to claim 1, wherein the cleaning unit further comprises a water connection and a cleaning line, wherein the cleaning line leads from the water connection to the two milk tanks, and wherein the cleaning agent supply apparatus comprises a pump configured to pump cleaning agent from the at least one cleaning agent container into the two milk tanks and the cleaning line.

6. The system according to claim 5, wherein the cleaning line is connected to spraying nozzles arranged in the two milk tanks.

7. The system according to claim 1, further comprising a first circulation line including a circulation pump and configured to connect the drawing line to the two milk tanks, wherein the circulation pump is configured to guide cleaning fluid back into the two milk tanks.

8. The system according to claim 1, wherein the full milk depot further comprises at least one of: (1) a heating apparatus; (2) a cooling apparatus; (3) a thermal insulation; and (4) a stirrer.

9. The system according to claim 1, further comprising a heating apparatus configured to heat milk located in one of the two milk tanks to a pasteurization temperature and further configured to hold the milk at the pasteurization temperature for a specified period of time.

10. The system according to claim 1, wherein the control is configured such that, when the filling time is specified, a time required for pasteurization of the full milk is taken into account, and wherein the pasteurization can take place either in one of (1) the two milk tanks, and (2) in an external pasteurization apparatus.

11. The system according to claim 1, further comprising a cleaning line configured to transition into two cleaning line portions at a branching point, wherein each of the two cleaning line portions leads to one of the two milk tanks, and wherein each of the two cleaning line portions comprises a shut-off valve.

12. The system according to claim 1, further comprising a full milk pump and a heating apparatus positioned in the milk supply line and configured to heat a fluid moved through the milk supply line to a desired temperature before filling the liquid ration container.

13. The system according to claim 1, wherein the control comprises a notification unit configured to inform a user of a status of the system.

14. The system according to claim 13, wherein the control further comprises a documentation unit configured to document the cleaning operation.

15. The system according to claim 1, wherein the cleaning agent supply apparatus comprises a cleaning agent line configured to supply cleaning agent from the at least one cleaning agent container to the preparing unit while circumnavigating the full milk depot, and wherein the control is configured to automatically perform a cleaning of the preparing unit based on a specified schedule separate from a cleaning of the full milk depot.

* * * * *